(12) United States Patent
Reichel et al.

(10) Patent No.: US 10,088,847 B2
(45) Date of Patent: Oct. 2, 2018

(54) TECHNIQUE FOR AUTOMATIC STOPPING OF A VEHICLE IN A TARGET AREA

(71) Applicant: Elektrobit Automotive GmbH, Erlangen (DE)

(72) Inventors: Michael Reichel, Ingolstadt (DE); Stefan Pruisken, Neunkirchen am Brand (DE)

(73) Assignee: Elektrobit Automotive GmbH, Erlangen (DE)

( * ) Notice: Subject to any disclaimer, the term of this patent is extended or adjusted under 35 U.S.C. 154(b) by 9 days.

(21) Appl. No.: 15/244,516

(22) Filed: Aug. 23, 2016

(65) Prior Publication Data
US 2017/0147004 A1   May 25, 2017

(30) Foreign Application Priority Data

Nov. 25, 2015 (DE) .................. 10 2015 015 277

(51) Int. Cl.
*B60K 28/02* (2006.01)
*G05D 1/02* (2006.01)
*B60W 40/08* (2012.01)

(52) U.S. Cl.
CPC .......... *G05D 1/0276* (2013.01); *B60W 40/08* (2013.01); *B60W 2040/0863* (2013.01)

(58) Field of Classification Search
CPC .................. B60K 28/06; B60W 40/08; B60W 2040/0818; B60W 2040/0863; G05D 1/0274; G05D 1/0276
USPC ......................................................... 701/23
See application file for complete search history.

(56) References Cited

U.S. PATENT DOCUMENTS

| | | | |
|---|---|---|---|
| 8,392,110 B2* | 3/2013 | Schunder | G01C 21/34 701/409 |
| 8,880,270 B1* | 11/2014 | Ferguson et al. | G05D 1/0212 701/23 |
| 9,205,816 B2 | 12/2015 | Kobana et al. | |
| 9,227,631 B2 | 1/2016 | Kammel et al. | |
| 2011/0238292 A1* | 9/2011 | Bresnahan | G01C 21/3407 701/533 |

(Continued)

FOREIGN PATENT DOCUMENTS

| | | |
|---|---|---|
| DE | 19801009 | 4/1999 |
| DE | 19801009 C1 | 4/1999 |

(Continued)

OTHER PUBLICATIONS

Machine-Assisted English language translation of DE 102012008090 A1; downloaded from espacenet.com, date Feb. 16, 2017; 25 pages.

(Continued)

*Primary Examiner* — Nadeem Odeh
(74) *Attorney, Agent, or Firm* — Howard & Howard Attorneys PLLC (57) ABSTRACT

The present disclosure relates to a method and a device for the automatic stopping of a vehicle in a target area. A method aspect of the disclosure comprises providing map data in which potential target areas for stopping of vehicles are defined by at least one attribute of map elements detecting an event that necessitates an automatic stopping of the vehicle determining a target area on the basis of the current position of the vehicle and the potential target areas defined in the map data, and triggering, on detection of the event, an automatic stopping process.

25 Claims, 8 Drawing Sheets

(56) References Cited

U.S. PATENT DOCUMENTS

| | | | | |
|---|---|---|---|---|
| 2014/0074338 A1* | 3/2014 | Nordbruch | ............ | B60W 40/08 |
| | | | | 701/23 |
| 2015/0006012 A1* | 1/2015 | Kammel | .............. | B60K 28/066 |
| | | | | 701/23 |
| 2015/0012166 A1* | 1/2015 | Hauler | ................. | G05D 1/0212 |
| | | | | 701/23 |
| 2016/0137198 A1 | 5/2016 | Hauler et al. | | |
| 2016/0368491 A1* | 12/2016 | Hauler | ...................... | B60T 7/22 |

FOREIGN PATENT DOCUMENTS

| | | |
|---|---|---|
| DE | 10200002 | 8/2002 |
| DE | 10200002 A1 | 8/2002 |
| DE | 102007035566 | 2/2009 |
| DE | 102007035566 A1 | 2/2009 |
| DE | 102011109618 | 2/2013 |
| DE | 102011109618 A1 | 2/2013 |
| DE | 102012008090 A1 | 10/2013 |
| DE | 102012008090 A1 | 10/2013 |
| DE | 112011105430 | 4/2014 |
| DE | 112011105430 T5 | 4/2014 |
| DE | 112011105431 | 4/2014 |
| DE | 112011105431 T5 | 4/2014 |
| DE | 112011105432 | 4/2014 |
| DE | 112011105432 T5 | 4/2014 |
| DE | 102013016436 A1 | 4/2015 |
| DE | 102013016436 A1 | 4/2015 |
| EP | 2210791 | 7/2010 |
| EP | 2210791 A1 | 7/2010 |
| JP | 2007331652 | 12/2007 |
| JP | 2007331652 A | 12/2007 |
| JP | 2008037218 | 2/2008 |
| JP | 2008037218 A | 2/2008 |
| JP | 2009163434 | 7/2009 |
| JP | 2009163434 A | 7/2009 |
| JP | 2010125923 | 6/2010 |
| JP | 2010125923 A | 6/2010 |
| KR | 1020110060457 | 6/2011 |
| KR | 1020110060457 A | 6/2011 |

OTHER PUBLICATIONS

Machine-Assisted English language translation of DE 102013016436 A1; downloaded from espacenet.com, date Feb. 16, 2017; 34 pages.

English language abstract and machine-assisted English translation for DE19801009 extracted from espacenet.com database on Sep. 19, 2016, 16 pages.

English language abstract and machine-assisted English translation for DE10200002 extracted from espacenet.com database on Sep. 19, 2016, 42 pages.

English language abstract and machine-assisted English translation for JP2007331652 extracted from espacenet.com database on Sep. 13, 2016, 31 pages.

English language abstract and machine-assisted English translation for DE102007035566 extracted from espacenet.com database on Sep. 12, 2016, 13 pages.

English language abstract and machine-assisted English translation for JP2009163434 extracted from espacenet.com database on Sep. 13, 2016, 27 pages.

English language abstract and machine-assisted English translation for JP2010125923 extracted from espacenet.com database on Sep. 19, 2016, 17 pages.

English language European Patent No. EP2210791, 13 pages.

English language abstract and machine-assisted English translation for DE102011109618 extracted from espacenet.com database on Sep. 12, 2016, 17 pages.

English language abstract and machine-assisted English translation for DE112011105430 extracted from espacenet.com database on Sep. 19, 2016, 25 pages.

English language abstract and machine-assisted English translation for DE112011105431 extracted from espacenet.com database on Sep. 12, 2016, 42 pages.

English language abstract and machine-assisted English translation for KR1020110060457 extracted from espacenet.com database on Sep. 19, 2016, 21 pages.

English language abstract and machine-assisted English translation for DE112011105432 T5 extracted from espacenet.com database on Oct. 11, 2016, 36 pages.

Machine Assisted English Translation of JP200837218 (A) downloaded from espace.net.com on Jan. 22, 2018; 45 pages.

\* cited by examiner

| Attribute | Attribute Value | Type |
|---|---|---|
| Safety | 0 | Car park |
| Safety | 1 | Hard shoulder Motorway |
| Safety | 2 | Right-hand lane Motorway |
| Safety | 3 | After curve |
| Safety | 4 | Centre of junction |
| Reachability | 0 | Car park |
| Reachability | 1 | Exit slip Motorway |
| Reachability | 2 | Between two exits |
| Reachability | 3 | Right-hand lane Motorway |
| Reachability | 4 | Left-hand lane Motorway |

Fig. 5

| Road section | Type | Safety | Reachability |
|---|---|---|---|
| XYZ-1 | After curve | 3 | 1 |
| XYZ-2 | Junction centre | 4 | 1 |
| XYZ-3 | Car park | 0 | 2 |

TECHNIQUE FOR AUTOMATIC STOPPING OF A VEHICLE IN A TARGET AREA

CROSS-REFERENCE TO RELATED APPLICATION

The subject application claims priority to German Patent Application No. 10 2015 015 277.7, filed Nov. 25, 2015, the disclosure of which is hereby incorporated by reference in its entirety.

TECHNICAL FIELD

The present disclosure relates generally to the field of vehicle safety. Specifically a device and a method for the automatic stopping of a motor vehicle in a target area are indicated. Furthermore, a device and a method are indicated for compiling map data in which potential target areas are to be defined.

BACKGROUND

Electronic devices in vehicles support correct driving among other things and also increase the safety of the driver, possible passengers and other road users. The current level of development focuses on supporting the driver even in cases in which the driver reacts only insufficiently or too late, or is in a state in which they are unable to react any more. Changes in the state of the driver can occur unforeseen and thus negatively influence their ability to drive or stop the vehicle correctly. If the driver has fallen asleep momentarily, for example, or has suffered a stroke, an accident is often unavoidable.

Various electronic devices, such as cameras, enable the detection of an impairment or abnormality in the state of the driver. Other electronic devices permit the vehicle to be stopped in this case. To stop a vehicle automatically, safety aspects must be taken into account, with reference to which the vehicle is to be stopped. It is important in this case not only to bring the vehicle reliably to a stop, however, but above all to stop it at a place at which it is located in the best possible safety. On the other hand, other road users should not be caused unnecessarily by a vehicle braking ahead of them or already stopped to brake themselves or to evade the vehicle.

A device is known from DE 11 2011 105 432 T5 which stops the vehicle automatically or maintains a stopping state in an emergency. A recognition process decides when the process of automatic stopping is necessary (e.g. if a negative change in the state of the driver occurs). The automatic stopping can also be requested by the driver. A safe place is then chosen for the automatic stopping of a vehicle. The safe place is an area in which the influence on the surroundings of deceleration and stopping of one's own vehicle is kept as small as possible. The place is chosen in such a way that one's own vehicle can be stopped without difficulty by an automatic slowing down and steering of the vehicle.

SUMMARY AND ADVANTAGES

The object of the present disclosure is to provide a method and a device for the safe stopping of a vehicle as well as suitable map data for this.

According to a first aspect, a method is disclosed for the automatic stopping of a vehicle in a target area. In the method, map data is provided in which potential target areas for the stopping of vehicles are defined by means of at least one attribute of map elements. An event is detected that necessitates an automatic stopping of the vehicle. Furthermore, a target area is determined on the basis of the current position of the vehicle and the potential target areas defined in the map data. Furthermore, on detection of the event, an automatic stopping process is triggered to stop the vehicle in the target area determined.

The target areas can be various positions for stopping, such as a certain place in a car park, a parking bay, a point of interest (POI) defined in the map data, a hard shoulder or also the road itself. The map elements can therefore correspond to such defined places or contain these.

The method can continuously comprise a preselection of one or more potential target areas within an electronic horizon, starting out from the current position of the vehicle. The preselection of one or more potential target areas can take place cyclically and/or on the basis of the event that necessitates automatic stopping of the vehicle. The target area can be determined on the basis of the one or more preselected target areas (e.g. on detection of the event that necessitates automatic stopping).

The electronic horizon can be determined on the basis of the map data. Furthermore, the electronic horizon can be determined on the basis of at least one parameter. A possible parameter can be a predefined maximum distance from the current position. The electronic horizon can thus be restricted to a certain distance. A predefined maximum journey time from the present position can also be determined as a parameter. The predefined maximum journey time can be a function in this case of the current driving speed and/or other conditions, such as the traffic volume, for example. Likewise, the electronic horizon can be determined with reference to a parameter, which is a place that can be reached at maximum from the current position on the basis of the amount of energy available (e.g. the present fuel level and/or the charging state of the battery).

For the (or each) attribute, two or more different attribute values can be defined for a target area prioritisation, which is taken into account when determining the target area. One possible attribute can be safety, to which an attribute value corresponding to the specific target area can be assigned. A lower attribute value can signify a higher safety than a high value (or vice-versa). A car park can thus be assigned a higher safety, as this has a very low traffic volume and low vehicle speeds. A road junction can be assigned a low safety, as the paths of vehicles intersect there. Stopping on or at the junction can thus signify an increased risk of collision with other vehicles. On the whole, target area prioritisation can thus take place with reference to the attribute values.

According to another aspect of the method, the event that necessitates automatic stopping of the vehicle can be a recognition that the driver is no longer able to drive or stop the vehicle properly. Optionally or in addition to this, the recognition can take place even during autonomous driving of the vehicle and independently of the state of the driver. Thus a safety-critical fault recognised in the context of autonomous driving (e.g. the loss of a data connection) can be recognised as a corresponding event.

The recognition that the driver is no longer able to drive properly can take place automatically in this case by a sensor system installed in the vehicle. The sensor system can be any type of camera, for example, which is located in the interior of the vehicle and can detect the driver. In addition or alternatively to this, the installed sensor system can be oriented so that the sensor system detects the environment of the vehicle. Leaving the road unintentionally or veering between a left and a right carriageway limit marking can be detected as an event that the driver is no longer able to drive or stop properly and that automatic stopping of the vehicle is required.

Alternatively or in addition to this, the event that necessitates automatic stopping of the vehicle can be a recognition that the driver has requested automatic stopping. The request by the driver can be executed by a lever e.g. on the steering wheel, a switch, a button, a touch-sensitive surface or a speech entry. The device for the request by the driver can be located in a place that is easily accessible for the driver.

According to another aspect of the method, the map data can be provided by a server, which has access to the map data and with which the vehicle is in contact via a wireless connection. The wireless connection can be any type of wireless connection, such as an Internet connection.

According to an implementation of the method, the automatic stopping process can comprise at least one of the following interventions. An automatic steering intervention can take place to influence the direction of travel of the vehicle. When changing the direction of travel, automatic actuation of a direction indicator can take place, in order to signal a change of direction to other road users. Furthermore, other road users can be alerted to the hazard situation by the automatic actuation of hazard warning lights. An automatic brake intervention and/or an automatic acceleration intervention can likewise take place. The various interventions can be executed in combination or singly, according to the position and situation in which the vehicle and the driver find themselves.

According to a second aspect, a method for processing map data is disclosed. The method comprises the provision of map data in which map elements are defined. Potential target areas for the stopping of vehicles are determined at least partly on the basis of the map data, wherein the potential target areas are defined in the map data by means of at least one attribute of the map elements.

The determination of the potential target areas can be executed at least partly on the basis of an analysis of a course or of a type of the map elements (e.g. of POIs, roads or road sections). In this case, curve progressions in particular can be taken into account (e.g. to prevent the vehicle from being stopped on a curve exit that cannot be seen or is difficult to see). Generally the potential target areas can be determined at a distance from curves or also at a distance from underpasses, one-way streets or tunnels. In addition or alternatively to this, the potential target areas can be determined taking account of the position of entrance and exit roads (in particular of motorways).

The map data can contain map elements such as POIs, roads and road sections (e.g. road kerbs). The potential target areas can then be determined on the basis of an analysis of one or more set types of POIs, roads and road kerbs.

The map elements contained in the map data provided can be characterised by additional information (e.g. an additional attribute). The type of POIs, roads and road sections can be recognised, for example, with reference to the additional information. Examples of the type are car parks, hard shoulders, parking bays or motorways.

The at least one attribute can generally be defined by a related attribute value for target area prioritisation. On the basis of the route or the type of map element, for example, a fixed attribute value can be assigned to an attribute. The assignment can be made with reference to an attribute value table, which can be predefined. With the aid of the assignment of an attribute value, a type of ranking of the target areas (e.g. safe and less safe target area) can be determined, so that target area prioritisation can take place.

The map data supplied can be processed manually by a user (e.g. the driver or the manufacturer) or automatically. The at least one attribute and the related attribute value of a map element can thus be adjusted to a changed situation of the map element. The manual processing can take place via a user interface suitable for this, displayed on a touch-sensitive screen and/or via a speech input.

The processed map elements can be communicated to a server and/or to systems of other users. In the communication with the server and/or the devices of other users, individual or several different map elements can be communicated.

According to a third aspect, map data are disclosed that have been obtained by one of the methods presented here. The map data can be stored by the on-board electronics or a separate storage medium, which can be accessed.

The disclosure likewise provides a computer program product for executing the methods presented here when the computer program product runs on one or more processors. The computer program product can be stored on a computer-readable data carrier (e.g. a semi-conductor memory, a CD- or DVD-ROM, etc.).

According to a fourth aspect, a device for the automatic stopping of a vehicle in a target area is disclosed. The device comprises an interface, which is configured to provide map data, in which potential target areas for the stopping of vehicles are defined by means of at least one attribute of map elements. The device further comprises a detection device, which is configured to detect an event that necessitates an automatic stopping of the vehicle. The device further comprises a control apparatus or control apparatus system, which is configured to determine a target area on the basis of the current position of the vehicle and the potential target areas defined in the map data. The control apparatus or control apparatus system is also configured to trigger an automatic stopping process on the detection of the event, in order to stop the vehicle in the target area determined. The control apparatus system can consist of several control apparatuses.

The device can comprise a memory with the map data. The interface can then be configured as a memory interface.

In addition or alternatively to this, the interface can be configured for wireless communication with a server, which has access to the map data. An increased memory requirement can thus be avoided, as not all available map data has to be stored locally in the vehicle. If the server has updated map data, the interface can also make updated map data available.

The updating of the map data can comprise not only the addition of new map elements, but also adaptation of the map elements and their related information. The map data provided can be adapted to a change in the environment of map elements. Possible changes of exemplary map elements can be external circumstances such as a landslide, overgrown parking spaces or other damage.

Alternatively or in addition, the device can detect a changed situation with reference to the map elements and on the basis of this detected changed situation of the map elements can process the at least one attribute and/or one attribute value of at least one map element automatically.

According to a sixth aspect, a vehicle is disclosed that comprises the devices presented here. The devices can be located in the vehicle as a device on its own or also be part of the on-board electronics or comprise a part of this.

According to a seventh aspect, a device for processing map data is disclosed. The device comprises a memory, which provides map data, in which map elements are defined. The device further comprises a processor with access to the memory and to a program code, which causes the processor to determine potential target areas for the stopping of vehicles at least partly on the basis of the map data and to define the potential target areas in the map data by means of at least one attribute of the map elements.

According to an eighth aspect, a memory is disclosed with map data in which potential target areas for the stopping of vehicles are defined by means of at least one attribute of map elements.

BRIEF DESCRIPTION OF THE DRAWINGS

Other aspects, advantages and details of the solution disclosed here result from the following description of embodiments that are explained with reference to the figures.

DETAILED DESCRIPTION

In the description below, for explanation but not for limitation, specific details (such as individual method steps) are described to ensure a fundamental understanding of the disclosure presented here. It is evident to the person skilled in the art that the present disclosure can be realised in other embodiments that diverge from these specific details.

Furthermore, it is revealed to the person skilled in the art that the services, functions and steps presented below can be implemented using software code, which is provided in combination with a processor, or using an application-specific integrated circuit (ASIC) or a digital signal processor (DSP). Although the embodiments below are described partly in the context of methods and devices, the disclosure presented here can likewise be realised in a computer program product as software code (e.g. as source or object code) as well as in a system that comprises a processor and a memory linked to the processor, which memory contains the computer program product.

Figure 1:
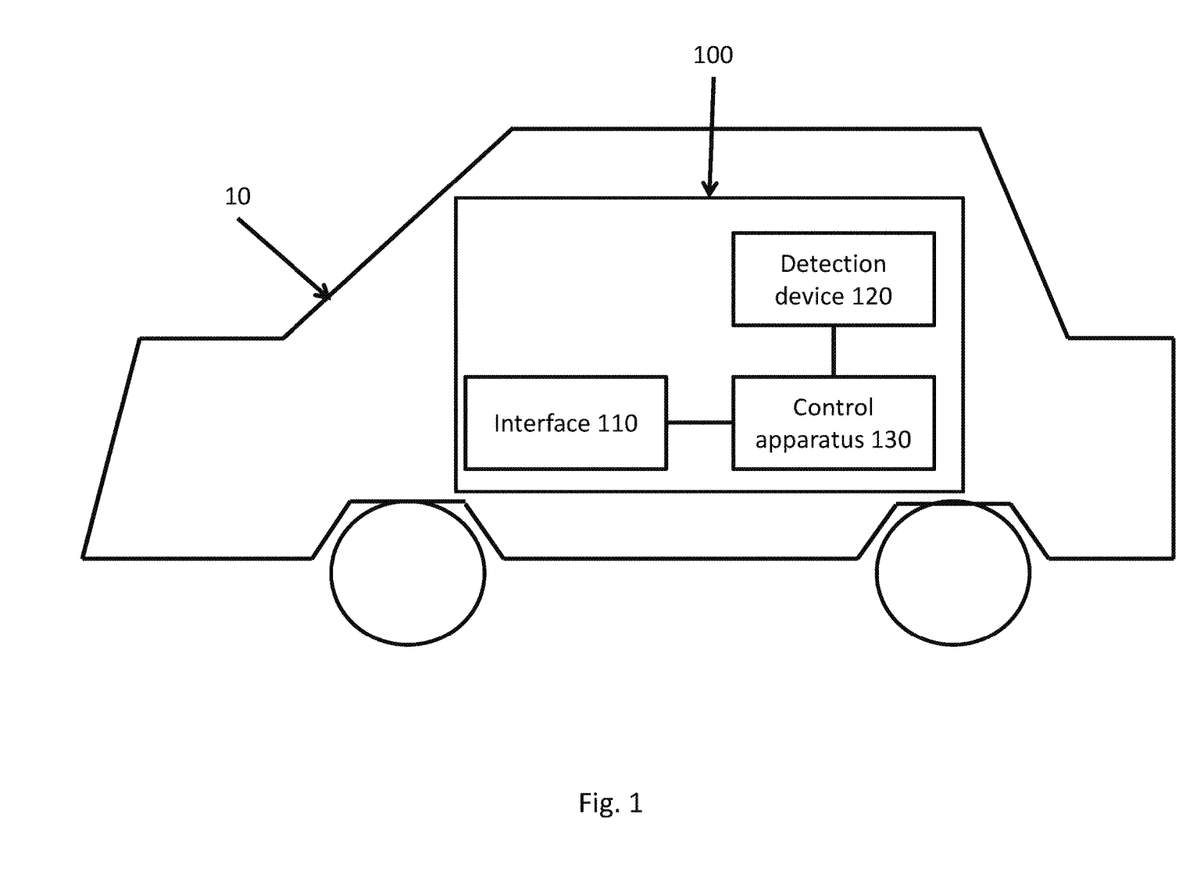
FIG. 1 shows a block diagram of a device for the automatic stopping of a vehicle according to one embodiment.

FIG. 1 shows a first embodiment of a device 100 for the automatic stopping of a vehicle 10. The device 100 comprises an interface 110, a detection device 120 and a control apparatus 130.

The interface 110 is configured to provide map data in which potential target areas for the stopping of the vehicle 10 are defined by at least one attribute of map elements. In a possible execution, the interface 110 is connected to a local memory (not shown) in the vehicle 10, on which the map data are stored and which can be accessed by the interface 110. In another execution the interface 110 is configured to be connected by wireless communication to a server (not shown) arranged outside the vehicle. The server has access to the map data and can transmit these to the interface 110.

The potential target areas are any places accessible for a vehicle 10 on which stopping of the vehicle 10 is possible. Possible target areas are certain places in a car park, on a hard shoulder, a traffic lane, a junction or also a pavement, for example. A defined potential target area is a potential target area that is defined by at least one attribute.

Furthermore, the detection device 120 is configured to detect an event that necessitates automatic stopping of the vehicle 10. The detection device 120 can be any type of sensor system, such as a (e.g. video) camera. The detected event can be an atypical change in the state of the driver in one execution. To assess a change in the state of the driver, body posture and/or movements of the body or parts of it are recognised and evaluated. A change in posture occurs in the event of pain, spasms or fainting, for example, which can be recognised also by atypical and/or jerky movements. Momentary nodding off, on the other hand, does not necessarily lead to a change in posture or doesn't even cause any movement. Instead the eyelids are closed for a longer period than if the driver blinks normally. This extended period can like-wise be detected by the detection device 120 as an event that necessitates automatic stopping of the vehicle 10. In addition or alternatively to this, the detection device 120 is formed to recognise the surroundings of the vehicle. For example, an unintended departure from the road or veering between a left and a right carriageway limit marking is detected and detected as an event that necessitates automatic stopping.

The detection of the event that automatic stopping is necessary is not restricted to an automatic detection. An event that automatic stopping is necessary can likewise be a request by the driver. For this, a switch, a touch-sensitive surface, a button or a speech input (not shown), for example, is present on the steering wheel or at another place that is easily accessible to the driver. If the driver operates this switch or this button, the request for automatic stopping of the vehicle is detected by the detection device 120. A possible situation would be that the driver notices a strong feeling of dizziness and desires automatic stopping on account of this.

The control apparatus 130 is configured to determine at least one specific target area from the potential target areas defined in the map data. The control apparatus 130 can also be a control apparatus system (not shown) consisting of several control apparatuses.

The determination of the at least one target area from the potential target areas generally takes place on the basis of the current position of the vehicle 10, which can be determined by a GPS signal or otherwise, and the defined potential target areas in the map data. In this case the control apparatus 130 accesses the interface 110, which is connected in turn to a memory or a server. The determination of a target area is executed continuously in one variant, so that one or more suitable target areas have already been determined depending on the position upon the occurrence of an event. It can thus be guaranteed at any time that at least one target area has already been determined for the automatic stopping of the vehicle. Alternatively to this, the determination of the at least one target area takes place cyclically and/or on the basis of an event that necessitates automatic stopping.

If an event that necessitates automatic stopping of the vehicle 10 was detected by the detection device 120, the control apparatus 130 is informed by the detection device. The control apparatus 130 then triggers an automatic stopping process. If necessary, a specific target area is also finally selected from several target areas selected in advance dependent on the position. The vehicle 10 is stopped in the target area determined by the automatic stopping process.

Figure 2:
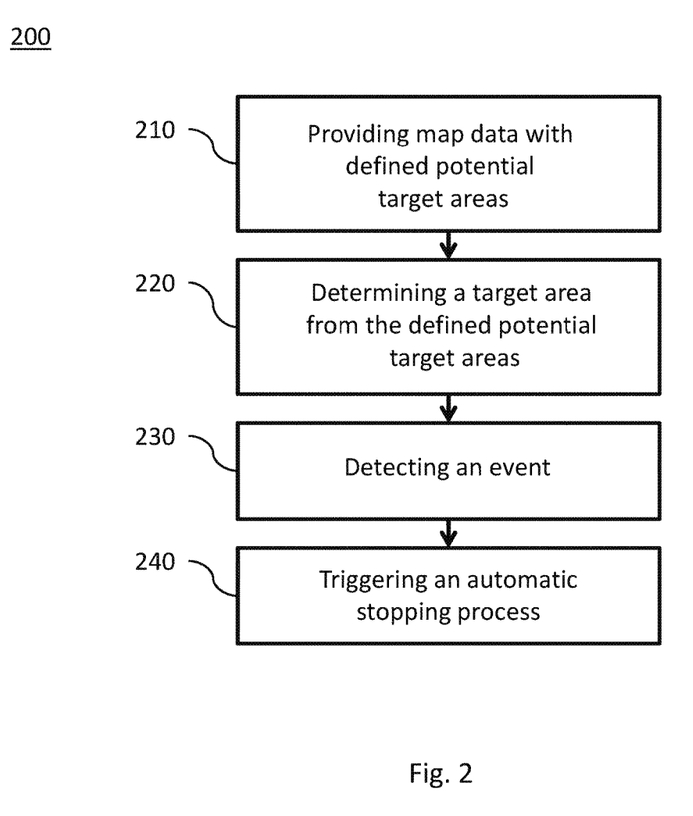
FIG. 2 shows a flow chart, which illustrates an embodiment of a method for the automatic stopping of a vehicle.

FIG. 2 shows a block diagram 200 of an exemplary method for the automatic stopping of a vehicle 10. The method can be executed by the device 100 shown in FIG. 1 or another device.

In a first step 210, map data with predefined potential target areas are provided by the interface 110. The potential target areas are defined by at least one attribute of map elements. Two or more different attribute values can be assigned to the at least one attribute (e.g. safety and/or reachability) in order to facilitate target area prioritisation. According to the type and/or route of the map element, an attribute value is assigned to a certain attribute, like the attribute safety. The attribute value reflects an assessment of the attribute in the form of a number. In its simplest execution the attribute is provided only as a flag or single bit.

In one execution, a low attribute value is prioritised when determining a target area. For example, the attribute safety with an attribute value zero reflects a car park, while an attribute value four represents the centre of a junction. It is self-evident that different map elements can have the same attribute value with reference to an attribute. Likewise, the method is not restricted to using numbers as attribute values. Any type of logical description that permits prioritisation by a computer can be used.

In the next step 220, a target area is determined from the predefined potential target areas by the control apparatus 130. With reference to potential target areas defined by at least one attribute and a related attribute value, the control apparatus 130 performs a prioritisation of these. In one implementation, all target areas located within an electronic horizon are taken into account in the prioritisation. According to a momentary position of the vehicle 10, a prioritised target area within the electronic horizon is thus determined starting out from the current position of the vehicle 10. If the position of the vehicle 10 changes, in that it travels further, the selection of potential target areas available within the electronic horizon changes. According to the change in position, the control apparatus 130 then determines a target area, which does not necessarily have to be different from the target area determined previously. The determination of a target area is thus executed continuously by the control unit 130, so that (at least) one suitable target area is determined for each point in time.

The electronic horizon is established by at least one parameter. A possible parameter is a predefined maximum distance (e.g. 500 m) or a predefined maximum journey time (e.g. 1 min) from the current position of the vehicle 10. Another possible parameter is a place that can be reached at maximum from the current position due to the amount of energy present (e.g. the present fuel level and/or the charging state of a battery). The selection of parameters is not limited to the parameters presented here and can include other or additional parameters. The parameters can also be established manually by the driver or another passenger. Optionally a value for a parameter is proposed for this by the device 100, which value can be accepted or changed. The value can also be set automatically by the device 100.

In a next step 230, an event is detected that necessitates automatic stopping. The event is detected by the detection device 120, which reports the detection of the event to the control apparatus 130. As already described for the detection device 120 in FIG. 1, the event can be the recognition of an atypical change in the state of the driver or a request by the driver, which necessitates automatic stopping. It is understood that the steps 220 and 230 can also be executed in a different sequence (or substantially at the same time).

If an event was detected, the step 240 is executed by the control apparatus 130 and an automatic stopping process in a determined target area is triggered. The automatic stopping process takes place through at least one automatic intervention, which is controlled by the control apparatus 130. The automatic intervention is an automatic steering intervention, an automatic braking intervention, an automatic actuation of a direction indicator, an automatic actuation of the hazard warning lights and/or an automatic acceleration intervention.

According to the situation in which the vehicle 10 finds itself, it makes sense that a single automatic intervention or a combination and/or a certain sequence of automatic interventions take place. An exemplary situation for a sequence of automatic interventions is that the vehicle is travelling in the middle lane of a three-lane motorway at a speed of 120 km/h. If an event is detected that necessitates automatic stopping of the vehicle 10, the control apparatus 130 triggers an automatic stopping process. The target area determined in this case can be the hard shoulder. To stop the vehicle 10 on the hard shoulder, first the travel direction and the speed must be changed by automatic interventions by the control apparatus 130. To simplify the example, let it be assumed that in the right-hand lane no other vehicle is located in the vicinity of the vehicle 10 to be stopped automatically. First an automatic actuation of the direction indicator by the control apparatus 130 takes place with the indication of executing a change in travel direction to the right. An automatic steering intervention in the right direction is then executed accordingly until the vehicle 10 is located on the hard shoulder. If the vehicle 10 is located on the hard shoulder or if necessary already before this, an automatic braking intervention takes place to bring the vehicle 10 to a stop. If the vehicle has stopped, the hazard warning lights are turned on. The cited example serves to illustrate the possible automatic interventions, but not a restriction of the combination and/or sequence of the automatic interventions.

It is possible for a user (e.g. the driver or the manufacturer), or the device 100 automatically to process the map data provided and primarily their attribution. This enables the user or the device 100 to include current impressions and/or estimates of individual map elements. For example, if a tree is concealing a parking space in such a way that this can no longer be negotiated, the user or the device 100 can process the map element. At least one attribute and/or attribute value of the map element are processed. It is accordingly possible, for example, to change the attribute value of the attribute safety to define such a parking space as less safe or to disqualify it completely as a potential target area.

Manual processing takes place via a suitable user interface, displayed on a touch-sensitive screen, and/or via a speech input. The touch-sensitive screen and/or the speech input can be part of the on-board electronics of the vehicle.

The map elements processed are stored in the map data of the vehicle or otherwise. The processed map elements can be communicated, for example via a wireless connection, to a server and/or devices of other users. The user decides in this case whether he wishes to communicate individual map elements or several different map elements. Vice-versa the user is thus offered the opportunity optionally to include map elements changed by other users or also suppliers in the map data used by his device.

As mentioned, the processing of the map data provided can take place optionally or additionally automatically by the device 100. For example, the tree on the parking space can be detected by the detection device 120 or in another way, so that then automatic processing of the corresponding map element takes place. It is possible for the device 100 to process the at least one attribute and/or the attribute value (as already described for manual processing).

Figure 3:
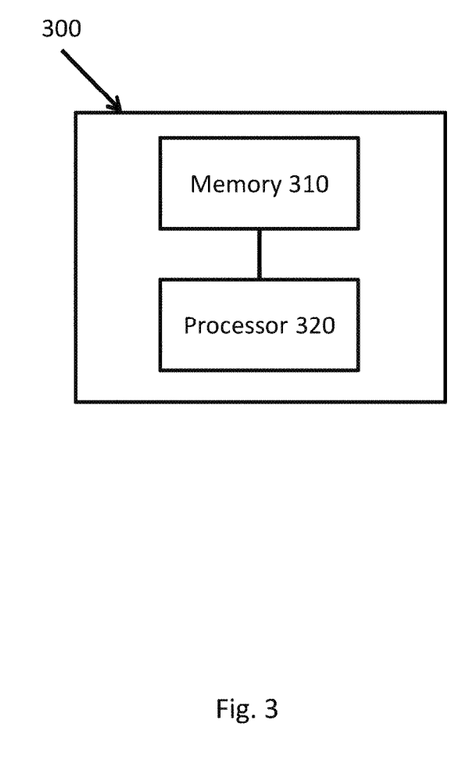
FIG. 3 shows a block diagram of a device for compiling map data according to an embodiment.

FIG. 3 illustrates an embodiment of a device 300 for processing (e.g., compiling) map data for use in the embodiments presented here or in other embodiments. The device 300 comprises a memory 310 and a processor 320 and can be provided outside ("offline" compilation) or inside ("online" compilation) the vehicle 10.

The memory 310 provides map data in which POIs, roads and/or road sections, for example, are defined as map elements. The map data provided can be any type of two-dimensional and three-dimensional map data. In addition, the map data can contain other information.

The map elements contained in the map data provided are characterised by information (e.g. as an additional attribute). With reference to the additional information, the device 300 recognises the type of map elements. Examples of the type of map elements are car parks, hard shoulders, parking bays or motorways.

The processor 320 has access to the stored map data and to a program code. The program code causes the processor 320 to determine potential target areas for the automatic stopping of vehicles. The determination of potential target areas takes place at least partly on the basis of the map data. Furthermore, the potential target areas are defined by means of at least one attribute of the map elements.

Figure 4:
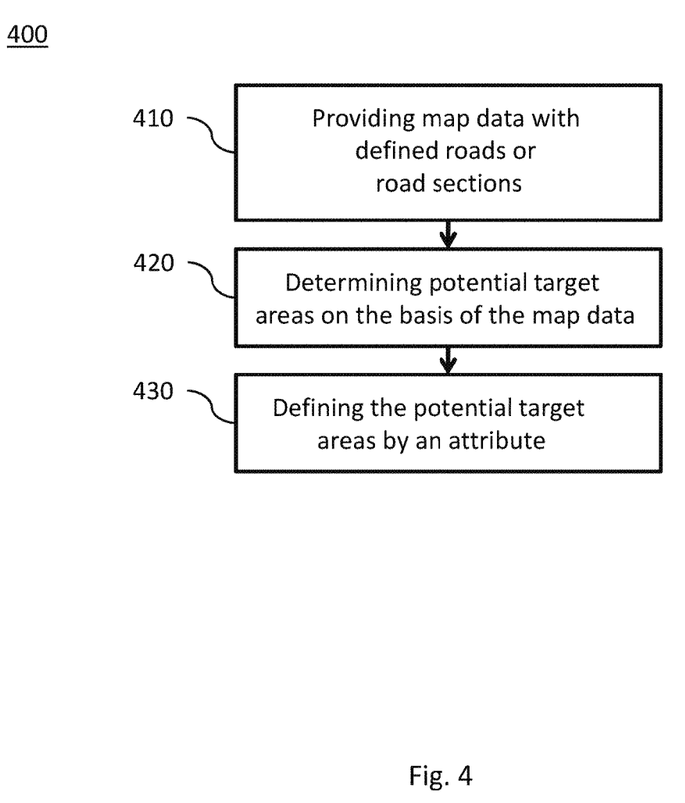
FIG. 4 shows a flow chart, which illustrates an embodiment of a method for compiling map data.

FIG. 4 shows a block diagram 400 of an exemplary method for processing map data. The method can be executed by the device shown in FIG. 3 or another device.

In a first step 410, map data with defined map elements (e.g. POIs, roads or road sections) are provided. The map data provided are stored in the memory 310.

In a second step 420, potential target areas are determined by the processor 320 at least partly on the basis of the map data. The map elements stored in the map data can specify a course or the type of this. The type can be a main road, a motorway, a normal road or also a road in a traffic-calmed zone. The course of a road element can specify that this runs straight for the next 100 m or makes a sharp curve. Potential target areas are determined at least partly on the basis of an analysis of the course and, if necessary, additionally of the type of map elements.

In addition to this, the following other information of the map elements can be taken into account in the analysis.

When determining the potential target areas, it can make sense to take account of the distance of these target areas from curves, underpasses, one-way streets or tunnels. A curve can lead to an impaired view of the road for road users. Consequently, an area immediately after a curve can be an unsuitable area in which to stop the vehicle 10.

Another aspect when determining potential target areas can be the position of entrance and exit slip roads. If the driver's state is critical and necessitates an ambulance, a target area should be selected that can be reached quickly by the ambulance. The vehicle 10 can be located on the motorway at the time the critical state occurs and the next exit slip road is 400 m away from the current position of the vehicle 10, for example. Ambulances are not permitted to drive in the opposite direction on a motorway either. Thus a potential target area determined in the exit slip road would mean a marked difference from a potential target area determined before the exit slip road for the driver. Taking account of entrance slip roads and exit slip roads can accordingly have a considerable influence when determining potential target areas.

Potential target areas can also be determined at least partly on the basis of an analysis of Points of Interest, POIs. Possible POIs can be hospitals, petrol stations, restaurants etc.

After potential target areas have been determined, the potential target areas are defined by means of at least one attribute of the map elements in the map data in a next step 430. A possible attribute can be safety or reachability. An attribute can also be defined together with an attribute value, so that target area prioritisation can take place. The definition of potential target areas by means of at least one attribute takes place with reference to a predetermined model, as shown in FIG. 5, for example.

Figure 5:
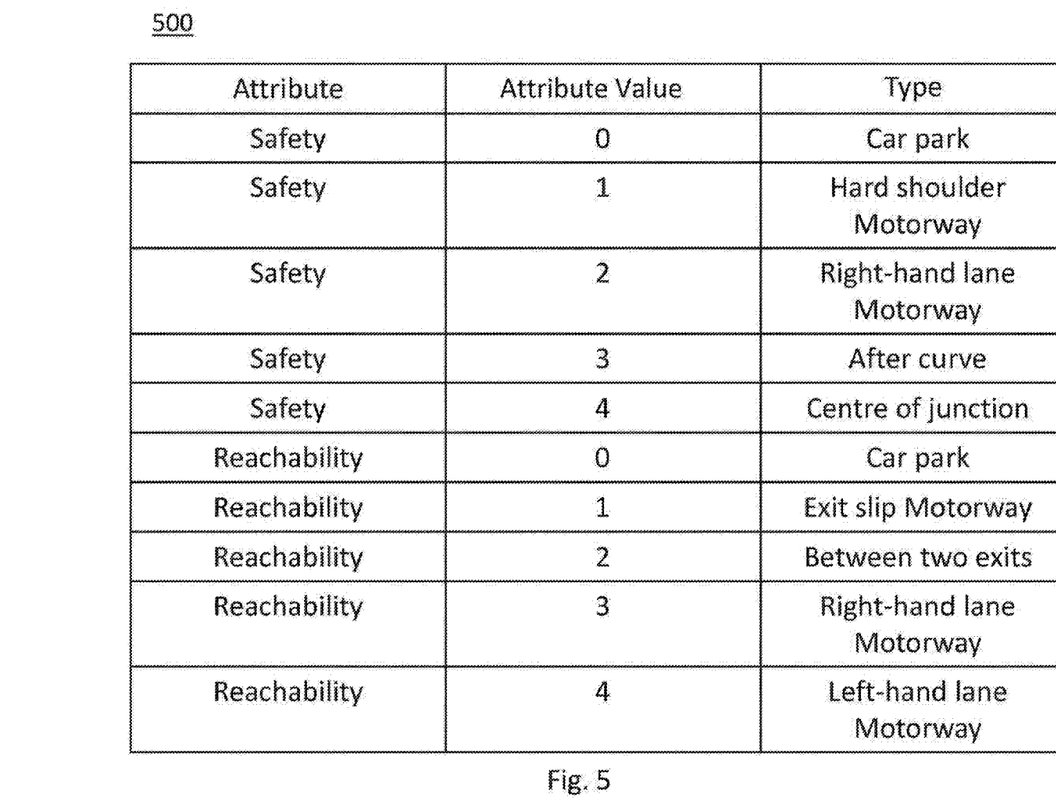
FIG. 5 shows a table with various attribute values.

FIG. 5 shows in the form of a table 500 an example of the assignment of an attribute value to the exemplary attributes "safety" and "reachability" corresponding to various potential target areas. According to the type of a map element, the attribute value 0 can be assigned to a car park for the attribute safety, as a car park can be categorised as very safe. On the other hand, an attribute value 4 can be assigned to a centre of a junction for the attribute safety, wherein a low attribute value corresponds to a high level of safety. The probability of a collision with one or more other road users will be high at a junction centre and so the safety is low. Furthermore, a further attribute, e.g. reachability, can be assigned to the potential target area apart from the attribute safety. An attribute value can likewise be assigned to the attribute reachability, so that in target area prioritisation the safety as well as the reachability by the vehicle 10 is taken into account.

On the basis of the defined potential target areas at least one target area is determined for the automatic stopping of the vehicle 10. When determining the at least one target area, target area prioritisation can take place with reference to the at least one assigned attribute and corresponding attribute value.

The target area prioritisation (e.g. in step 220 of FIG. 2) can be carried out in various ways. It is possible to proceed in such a way that first all potential target areas (e.g. within an electronic horizon) that have a value of zero in the case of the assigned attribute safety are taken into consideration. If only one potential target area corresponds to this preselection, this is prioritised and used. If several potential target areas correspond to the preselection, a further attribute, e.g. reachability, can be taken into account for the target area prioritisation. The potential target area with the lowest reachability value (corresponding to the best reachability) is then prioritised. If following the inclusion of the second attribute at least two potential target areas are still available, another attribute can be taken into account for the prioritisation. If it comes to the situation that two or more potential target areas have the same prioritisation, the nearest is automatically selected, for example. Another option for executing the target area prioritisation can be to form the sum of the attribute values. The target area or areas with the lowest sum is/are then prioritised. It is evident to the person skilled in the art that a prioritisation with reference to the attributes and attribute values can be executed in different ways and the above examples should not be regarded as a limitation.

Figure 6:
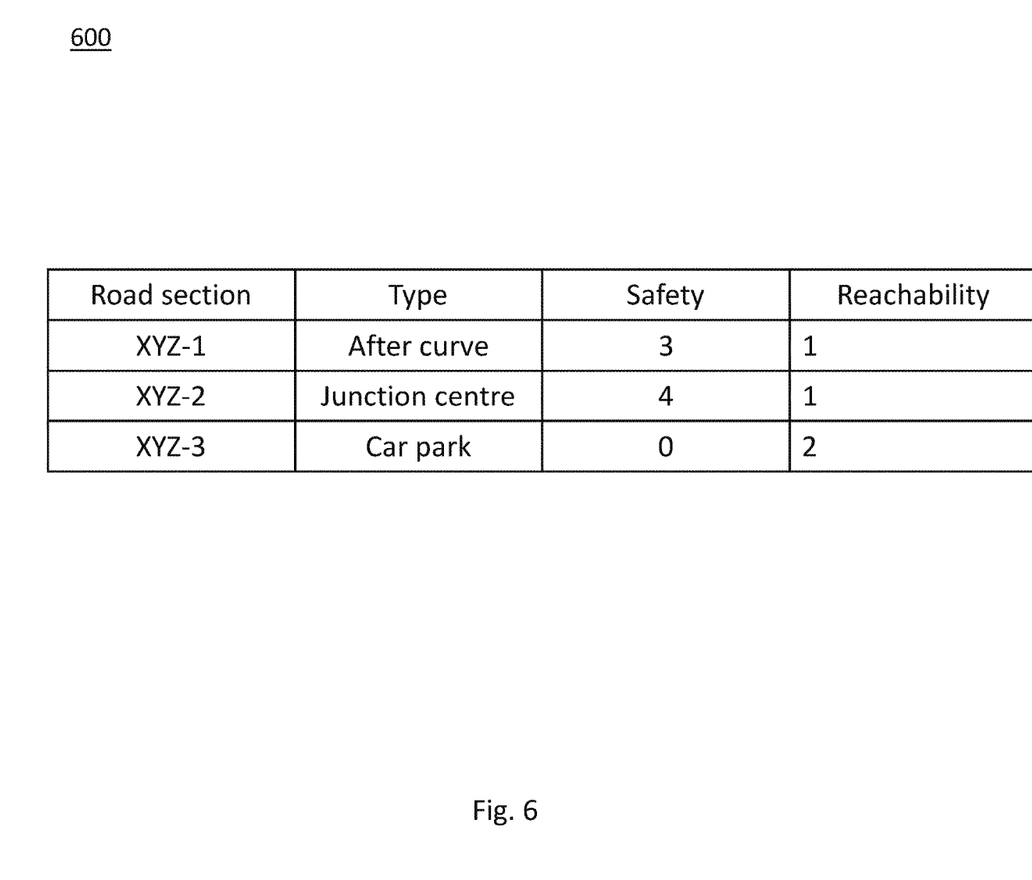
FIG. 6 shows an illustration of the attributed map data.

FIG. 6 shows a table 600 as an example of the map data provided (FIGS. 1 and 2) or compiled (FIGS. 3 and 4). Road sections are contained in the map data that are characterised as potential target areas by means of two exemplary attributes with related attribute values. A road can generally be divided into several road sections, corresponding e.g. to a change in the route and/or the distance from curves.

In the example in FIG. 6, which is used only for illustration, a certain road is divided into three different road sections XYZ-1 to XYZ-3 on the basis of the type of road section and the change in the course of the road. The first road section is a curve, which leads around a building and then leads to a junction. On one junction corner of the junction is a car park area with several parking spaces. The attributes of safety (e.g. according to FIG. 5) and reachability can be assigned to all three road sections. On account of the different courses the road sections XYZ-1 to XYZ-3 have different attribute values for the corresponding attributes. As can be seen from the example, the attributes are not directly related to one another. The curve, thus the road section XYZ-1, has an attribute value 3 for the attribute safety and an attribute value 1 for the attribute reachability. On account of the building, the curve is not visible and is accordingly unsafe but easily reachable. The centre of the junction, thus the road section XYZ-2, is likewise unsafe due to the increased traffic there, but easily reachable. In contrast to the centre of the junction and the curve, the car park, thus the road section XYZ-3, is a very safe target area. Since the car park can have several parking vehicles, a free parking space can be more difficult to reach in the event of many parking vehicles.

Figure 7:
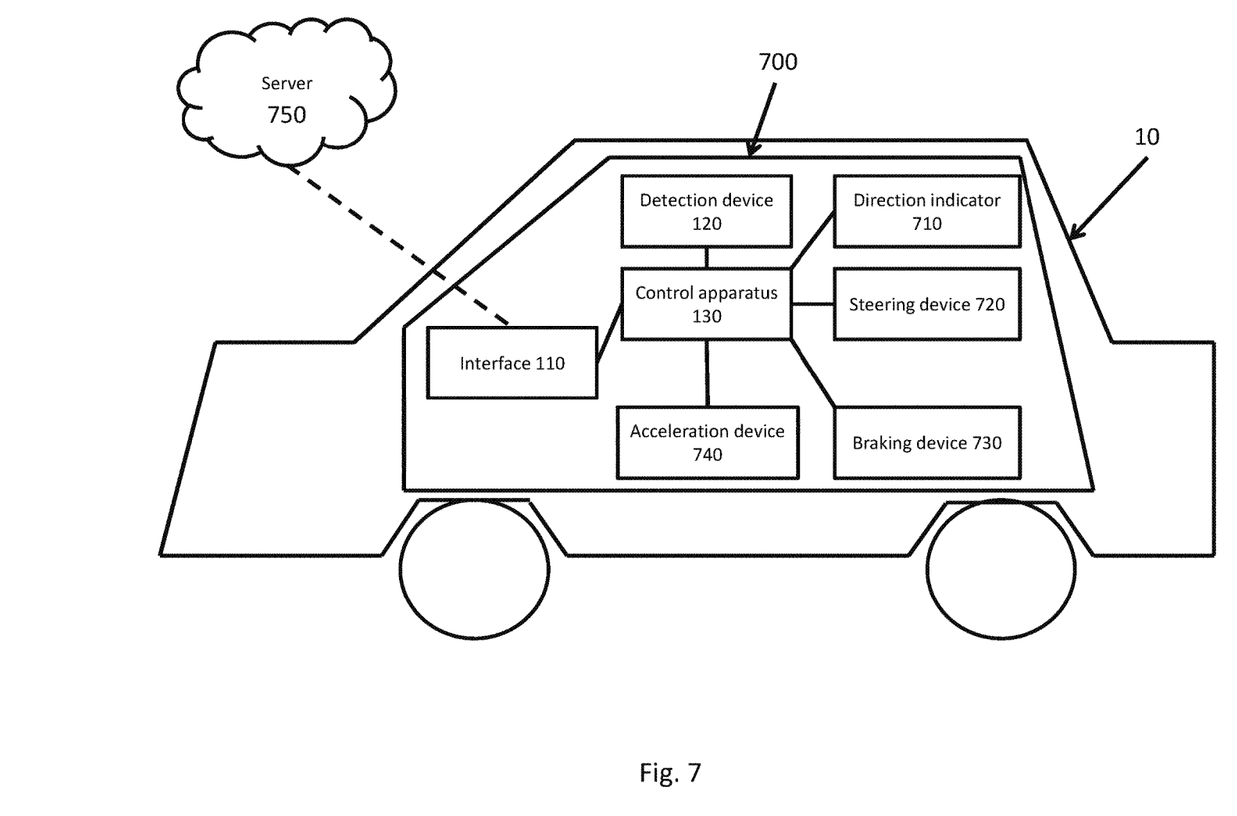
FIG. 7 shows a block diagram of a device for the automatic stopping of a vehicle according to another embodiment.

FIG. 7 shows an embodiment 700 of a combination of the device(s) disclosed here with typical other devices installed in a vehicle 10. Typical devices can be a direction indicator 710, a steering device 720, a braking device 730 and an acceleration device 740, which can be activated by the control apparatus 130 for automatic stopping. The interface 110 provides map data. The map data can be provided by the interface 110 via a connection to a server 750. Alternatively or in addition, the interface 110 can access a local memory in which the map data are stored.

Figure 8:
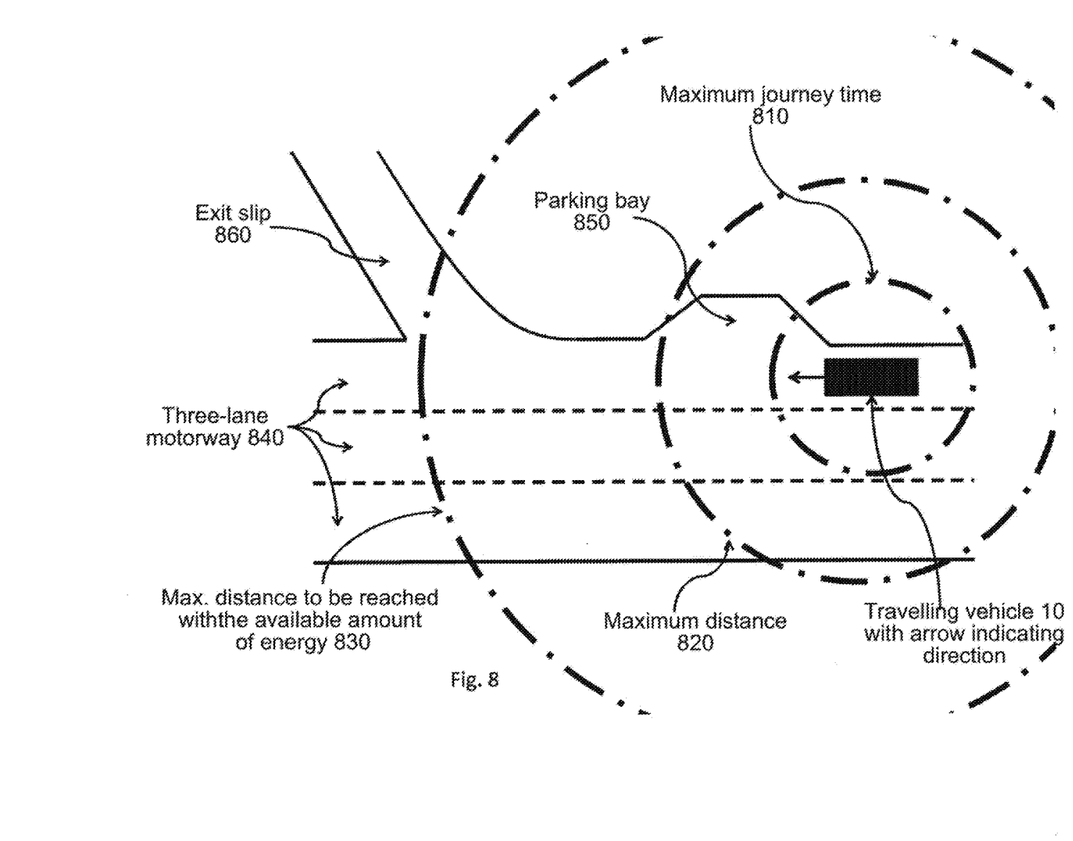
FIG. 8 shows a schematic diagram for illustrating different electronic horizons.

FIG. 8 illustrates an electronic horizon established by at least one parameter for use in the (pre-) selection of target areas. The dashed circles are the electronic horizons for the parameter of maximum journey time 810, maximum distance 820 and maximum distance to be reached with the amount of energy present 830. The vehicle 10 is also located on a three-lane motorway 840 with a parking bay 850 and an exit slip road 860. According to the electronic horizon determined, different potential target areas are available. For the parameter of maximum journey time, the vehicle 10 can be stopped on the potential target area of the right-hand lane. For the parameter of maximum distance, the potential target area of the parking bay 850 can also be available. If the parameter of the maximum distance to be reached with the amount of energy present 830 is selected instead, a possible potential target area is the exit slip 860.

In the example drawn in FIG. 8, the parking bay 850 could have the attribute value 0, for example, with regard to the attribute "safety", while the area of the exit slip 860 corresponds to lower safety (e.g. the attribute value 3) and the area after the exit slip 860 again has a higher safety (e.g. attribute value 2). An exemplary area directly after an exit slip (not shown in FIG. 8) could have the attribute value 2 in relation to safety, for example, and moreover have a particularly favourable value (e.g. attribute value 0) in relation to the attribute "reachability". For the vehicle 10 shown in FIG. 8, therefore, an optimal target area can be determined on the basis of the devices and methods described above, taking account of a reachable area within a given electronic horizon (depending on the trade-off between the attributes "safety" and "reachability", if applicable also only taking account of one of these attributes).

It is understood that the preceding description of the embodiments is purely of an exemplary nature and does not restrict the invention defined in the claims. Advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A device comprising:
a detection device configured to detect an event that necessitates an automatic stopping of the vehicle; and
one or more controllers being configured to:
provide map data in which potential target areas for stopping of a vehicle are defined by at least one attribute of map elements;
determine an electronic horizon defined by at least one of a predefined maximum journey time from a current position of the vehicle and a maximally reachable place from the current position of the vehicle determined based on an available amount of energy associated with the vehicle;
continuously preselect one or more of the potential target areas within the electronic horizon; and
determine a target area in which to automatically stop the vehicle on the basis of the current position of the vehicle and the one or more of the potential target areas within the electronic horizon, and to trigger, on detection of the event, an automatic stopping process in order to stop the vehicle in the determined target area.

2. The device according to claim 1, wherein the one or more controllers are configured for wireless communication with a server being configured to provide the one or more controllers with access to the map data.

3. The device according to claim 1, wherein the one or more controllers are configured to detect a changed situation with reference to the map elements and to process at least one of the at least one attribute and at least one attribute value of at least one map element automatically based on the changed situation.

4. The device according to claim 1, wherein two or more different attribute values related to prioritization of the target area are defined for the at least one attribute of map elements and wherein the two or more different attribute values are taken into account when determining the target area.

5. The device according to claim 4, wherein the at least one attribute comprises a safety attribute and a reachability attribute.

6. The device according to claim 1, wherein the automatic stopping process comprises at least one of the following interventions: an automatic steering intervention, an automatic braking intervention, an automatic actuation of a direction indicator, an automatic actuation of hazard warning lights and an automatic acceleration intervention.

7. The device according to claim 1, wherein the one or more controllers are further configured to determine the one or more of the potential target areas based on one or more of the following:
analysis of a course or of a type of the map elements;

a distance from the one or more of the potential target areas to at least one of a curve, an underpass, a one-way street and a tunnel; and a position of at least one of an entrance slip road and an exit slip road.

8. The device according to claim 1, wherein the map elements contain at least one of Points of Interest (POIs), roads, and road sections and wherein the one or more controllers are further configured to determine the one or more of the potential target areas based on an analysis of one or more predetermined types of at least one of the POIs, roads and road sections.

9. The device according to claim 1, wherein the map data is three-dimensional.

10. A vehicle, comprising the device according to claim 1.

11. A computer-implemented method comprising:

providing map data in which potential target areas for stopping of a vehicle are defined by at least one attribute of map elements;

determining an electronic horizon defined by at least one of a predefined maximum journey time from a current position of the vehicle and a maximally reachable place from the current position of the vehicle determined based on an available amount of energy associated with the vehicle;

continuously preselecting one or more of the potential target areas within the electronic horizon;

detecting an event that necessitates an automatic stopping of the vehicle;

determining a target area in which to automatically stop the vehicle on the basis of the current position of the vehicle and the one or more of the potential target areas defined within the electronic horizon; and triggering, on the detection of the event, an automatic stopping process in order to stop the vehicle in the determined target area.

12. The computer-implemented method according to claim 11, wherein two or more different attribute values related to prioritization of the target area are defined for the at least one attribute of map elements and wherein the two or more different attribute values are taken into account when determining the target area.

13. The computer-implemented method according to claim 12 wherein the at least one attribute comprises a safety attribute and a reachability attribute.

14. The computer-implemented method according to claim 11, wherein the event that necessitates the automatic stopping of the vehicle is a recognition that a driver of the vehicle is no longer able to drive or stop the vehicle properly.

15. The computer-implemented method according to claim 14, wherein the recognition occurs automatically and by using a sensor system installed in the vehicle.

16. The computer-implemented method according to claim 11, wherein the event that necessitates the automatic stopping of the vehicle is a recognition that a driver of the vehicle has requested an automatic stop.

17. The computer-implemented method according to claim 11, wherein the map data is provided by a server being configured with access to the map data and with which the vehicle is in contact via a wireless connection.

18. The computer-implemented method according to claim 11, wherein the automatic stopping process comprises at least one of the following interventions: an automatic steering intervention, an automatic braking intervention, an automatic actuation of a direction indicator, an automatic actuation of hazard warning lights and an automatic acceleration intervention.

19. The computer-implemented method according to claim 11, wherein determining the one or more of the potential target areas is further carried out at least partly on the basis of an analysis of a course or of a type of the map elements.

20. The computer-implemented method according to claim 11, wherein determining the one or more of the potential target areas is further based on a distance from the one or more of the potential target areas to at least one of a curve, an underpass, a one-way street and a tunnel.

21. The computer-implemented method according to claim 11, wherein determining the one or more of the potential target areas is further based on a position of at least one of an entrance slip road and an exit slip road.

22. The computer-implemented method according to claim 11, wherein the map elements contain at least one of Points of Interest (POIs), roads, and road sections and wherein determining the one or more of the potential target areas is further based on an analysis of one or more predetermined types of at least one of the POIs, roads and road sections.

23. The computer-implemented method according to claim 11, wherein the at least one attribute is defined together with one or more attribute values related to prioritization of the target area.

24. The computer-implemented method according to claim 11 wherein the map data is three-dimensional.

25. A non-transitory computer readable medium, comprising instructions, which one executed by a processor, is configured to implement the computer-implemented method according to claim 11.

* * * * *

UNITED STATES PATENT AND TRADEMARK OFFICE
CERTIFICATE OF CORRECTION

PATENT NO. : 10,088,847 B2
APPLICATION NO. : 15/244516
DATED : October 2, 2018
INVENTOR(S) : Michael Reichel et al.

It is certified that error appears in the above-identified patent and that said Letters Patent is hereby corrected as shown below:

In the Specification

At Column 14, Line number 29, delete: "deter mining" replace with --determining--

Signed and Sealed this
Nineteenth Day of March, 2019

Andrei Iancu
*Director of the United States Patent and Trademark Office*